United States Patent [19]

Louthan et al.

[11] 4,295,668

[45] Oct. 20, 1981

[54] ADAPTER FOR CONNECTING PLASTIC PIPE SYSTEM TO CAST IRON PIPE SYSTEM

[75] Inventors: Jean H. Louthan, Dallas, Tex.; Russell C. Cox, Taylor, S.C.; William V. Crawford, Williamstown, Ky.

[73] Assignee: Phillips Petroleum Company, Bartlesville, Okla.

[21] Appl. No.: 52,900

[22] Filed: Jun. 27, 1979

[51] Int. Cl.$^3$ .............................................. F16L 55/00
[52] U.S. Cl. ....................................... 285/21; 285/174; 285/239; 285/337; 285/369; 285/383; 285/423; 285/342; 285/368
[58] Field of Search ............... 285/245, 239, 174, 337, 285/423, 342, 343, 368, 21, 369, 383

[56] References Cited

U.S. PATENT DOCUMENTS

| | | | |
|---|---|---|---|
| 2,449,243 | 9/1948 | Miller | 285/342 X |
| 2,961,363 | 11/1960 | Lowes | 285/21 X |
| 3,301,576 | 1/1967 | Vigneron | 285/368 X |
| 3,627,357 | 12/1971 | Sanders | 285/368 X |
| 3,915,480 | 10/1975 | Kish | 285/174 |
| 4,111,466 | 9/1978 | Deregibus | 285/239 |

FOREIGN PATENT DOCUMENTS

| | | | |
|---|---|---|---|
| 274144 | 10/1964 | Australia | 285/342 |
| 1280054 | 11/1961 | France | 285/368 |
| 807801 | 1/1959 | United Kingdom | 285/342 |

*Primary Examiner*—Dave W. Arola

[57] ABSTRACT

An adapter for connecting a plastic pipe system to a metallic pipe system; including an elongated, plastic sleeve having a first end thereof adapted to be joined to a plastic pipe system and a second end thereof adapted to be joined to a metallic pipe system and an elongated, metallic reinforcing sleeve, having an outside diameter substantially equal to the inside diameter of the second end of the plastic sleeve, a length less than the length of the plastic sleeve and a significant portion of one end tapered from the diametric exterior thereof inwardly and toward the one end thereof, mounted in the second end of the plastic sleeve with its tapered end toward the interior of the plastic sleeve. A pipeline structure including the adapter joined at one end to a plastic pipe system and the other end joined to a metallic pipe system is also described.

18 Claims, 8 Drawing Figures

ADAPTER FOR CONNECTING PLASTIC PIPE SYSTEM TO CAST IRON PIPE SYSTEM

BACKGROUND OF THE INVENTION

The present invention relates to an adapter for connecting a plastic pipe system to a metallic pipe system. More specifically, the present invention relates to an adapter for connecting a plastic pipe system to a metallic pipe system in which the end of the adapter connectable to the metallic pipe system is reinforced. In another aspect the present invention relates to a pipeline structure comprising a plastic pipe system and a metallic pipe system coupled by an adapter.

In pipeline structures, it has become rather common practice to utilize metallic pipe systems for a portion of the piping service and plastic pipe systems for other portions. One problem encountered in such piping systems is the difficulty of connecting the plastic pipe system to the metallic pipe system. While plastic pipe may be connected to other plastic pipe by gluing or melt fusion and metallic pipe can be joined to metallic pipe by welding or clamping, with appropriate gaskets, the relatively simple expedients such as melt fusion and welding cannot be used for connecting a plastic pipe system to a metallic pipe system. Consequently, clamping of the sections of the plastic pipe system to the metallic pipe system has been found to be the only reliable means of connection available. A wide variety of fittings and adapters for connecting a plastic pipe system to a metallic pipe system have heretofore been proposed. One problem in such coupling systems is the inability to attain a leakproof connection, particularly where a gas is to be transmitted through the system as when utilizing a metallic pipe system for the main of a natural gas distribution system and plastic pipe for branch systems therefrom. Usually a coupling or adapter is made primarily from plastic so that it may be melt fused to the plastic piping system. In order to appropriately couple the plastic adapter or coupling to the metallic pipe system, the prior art has provided a number of rather complex and expensive fittings for both the plastic adapter and the metallic pipe system to which it is to be attached. Since pressure is normally applied to the plastic adapter or coupling in order to provide a fluid-tight, clamped joint the application of such pressure often results in distortion, cracking or other damage to the plastic coupler or adapter.

It is therefore an object of the present invention to provide an adapter for connecting plastic pipe systems to metallic pipe systems which overcomes the above mentioned difficulties of the prior art devices. Another object of the present invention is to provide a simple and inexpensive adapter for coupling a plastic pipe system to a metallic pipe system. Another object of the present invention is to provide an adapter for coupling a plastic pipe system to a metallic pipe system which can be connected to the plastic system by simple melt fusion and to the metallic pipe system by a simple clamping system. Yet another object of the present invention is to provide a plastic adapter for connecting a plastic pipe system to metallic pipe system which can be coupled to the metallic pipe system by clamping without damage to the adapter. Another and further object of the present invention is to provide an adapter for coupling a plastic pipe system to a metallic pipe system which provides a leakproof junction for service in a transport of gas under pressure. These and other objects and advantages of the present invention will be apparent from the following description.

SUMMARY OF THE INVENTION

In accordance with the present invention an adapter means is provided for coupling a plastic pipe system to a metallic pipe system which includes an elongated, plastic sleeve having a first end adapted to be joined to the plastic pipe system and a second end adapted to be joined to the metallic pipe system and an elongated, metallic reinforcing sleeve having an outside diameter substantially equal to the inside diameter of the second end of the plastic sleeve, a length less than the length of the plastic sleeve and a significant portion of one end of the metallic sleeve tapered from its diametric exterior inwardly and toward the one end thereof and mounted in the second end of the plastic sleeve with the tapered end toward the interior of the plastic sleeve. A coupled piping system is provided comprising an elongated, plastic adapter sleeve having a first end joined to a plastic pipe system and a second end coupled to a metallic pipe system, the second end of the adapter, having an elongated metallic reinforcing sleeve having an outside diameter substantially equal to the inside diameter of the second end of the plastic sleeve, a length less than the length of the plastic sleeve and a significant portion of one end of the metallic sleeve tapered from its diametric exterior inwardly and toward the one end thereof and mounted in the second end of the plastic sleeve with its tapered end toward the interior of the plastic sleeve coupled to a metallic pipe system by an annular, an annular, compressible gasket means mounted adjacent the juncture of the metallic pipe system and the second end of the adapter and an annular clamp means adapted to contact the gasket means and press the gasket means into fluid tight engagement with the juncture of the adapter and the metallic pipe system.

DESCRIPTION OF THE PREFERRED EMBODIMENTS

The adapter of the present invention provides a simple and inexpensive means for coupling a plastic pipe system such as a polyolefin pipe system to a metallic pipe system such as a cast iron pipe system. The adapter of the present invention is particularly useful for connecting a plastic pipe system and a metallic pipe system utilized in the transport of natural gas under pressure.

Figure 1:
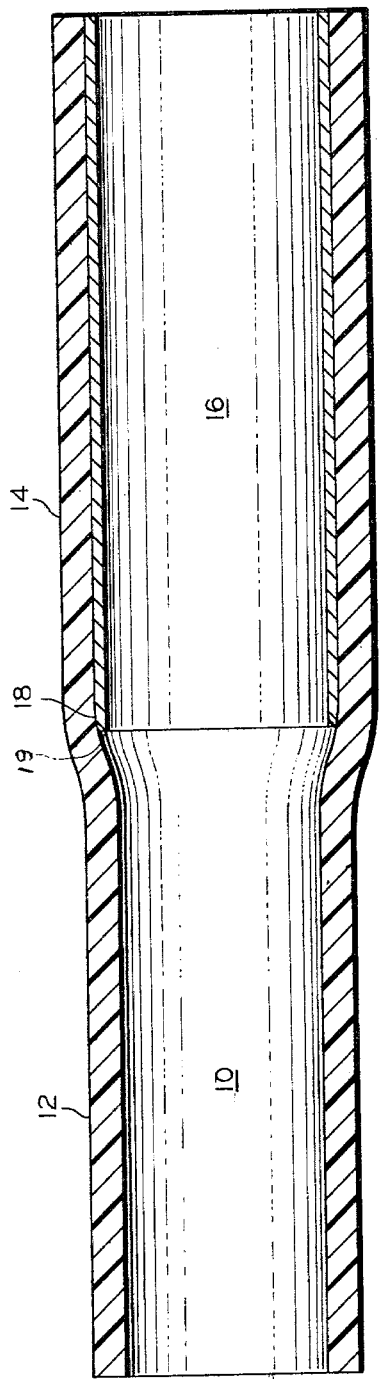
FIG. 1 of the drawings is a cross-sectional view of the adapter of the present invention.

Referring now to FIG. 1, the coupling of the present invention comprises an elongated plastic sleeve 10, having a first end 12 adapted to be joined to a plastic pipe system and a second end 14 adapted to be joined to a metallic pipe system. The plastic sleeve 10 can be made of polyolefin pipe but obviously should be of the same type plastic as the plastic piping system to which it is to be joined in order to facilitate joining the two. The end 12 which is to be joined to the plastic pipe system is shown as a plain pipe end but could be a bell end adapted to receive a plain pipe end of the plastic pipe system. In this instance, the two joints can be glued, however, for use in transporting gas under pressure, it is preferable that end 12 be of the same outside and inside diameter as the plain pipe end of the plastic pipe system so that the two can be butted and melt fused together. As will be discussed in greater detail hereinafter, the second end 14 is adapted to be joined to a metallic pipe section by clamping. In order to supply sufficient clamping pressure to the end 14 to provide a leakproof connection, particularly for use in transporting gas, it is highly desirable that the end 14 which is to be clamped to the metallic piping system be reinforced. For this purpose a metallic reinforcing sleeve 16 is mounted within end 14 of sleeve 10. Sleeve 16 is preferably of steel and has an outside diameter substantially equal to the inside diameter of end 14 of the plastic sleeve 10. Sleeve 16 is preferably press fit into end 14 of the plastic sleeve. When the reinforcing sleeve 16 is press fit into end 14 of the plastic sleeve 10, there is a tendency for the inner end of sleeve 16 to gouge the internal wall of sleeve 10 and thus to weaken the sleeve. In order to prevent this gouging or weakening of the sleeve 10, reinforcing sleeve 16 is tapered from its diametric exterior inwardly and toward the inner end thereof to provide a tapered portion 18 and a rounded edge 19. Tapered portion 18 should extend from a line around the outside surface of sleeve 16 for a length of about four times the wall thickness of the sleeve to provide a thickness of one half the wall thickness at the rounded edge 19. Plastic sleeve 14 has a substantially equal wall thickness throughout its length. The internal and external diameters of end 14 of plastic sleeve 10 are larger than the respective internal and external diameters of end 12 of plastic sleeve 10. This difference in the respective diameters is substantially equal to two times the thickness of the thickest portion of the reinforcing sleeve 16 in order to accommodate the reinforcing sleeve and have the internal diameter of the reinforcing sleeve substantially equal to the internal diameter of the end 12 of plastic sleeve 10.

Figure 2:
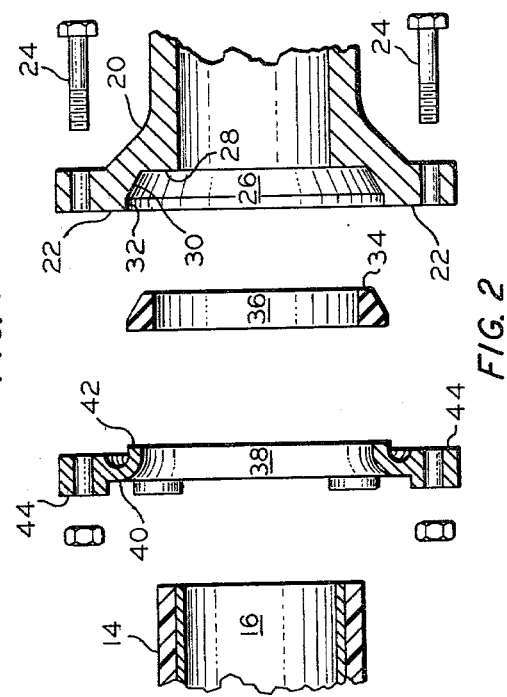
FIG. 2 is an exploded, cross-sectional view of one embodiment of a coupler system for the adapter of FIG. 1.

FIG. 2 of the drawings shows an exploded, cross-sectional view of one means of coupling end 14 of the adapter to a metallic pipe system. In accordance with FIG. 2, the end of the metallic pipe system is provided with a coupling means 20. Coupling means 20 may be a suitable metallic coupling welded to the metallic pipe of the metallic pipe system, a coupling of a metallic valve or it may be a coupling formed on the end of a metallic pipe section. In any event, coupling 20 is provided with an annular flange portion 22. Flange portion 22 is provided with holes to receive coupling bolts 24. Flange 22 may have a circular periphery or be provided with protruding ears or lobes to accept bolts 24. Coupling 20 is provided with a shaped, internal groove 26 having a transverse shoulder 28, an inclined portion 30 and a longitudinal portion 32. Shoulder 28 is dimensioned so as to receive end 14 of the adapter in butting relationship therewith as well as shoulder 34 of annular, compressible sealing ring or gasket 36. The remainder of the groove means 26 generally conforms to the exterior configuration of sealing ring 36. The interior of sealing ring 36 is adapted to slide over the exterior of end 14 of the adapter. Sealing ring 36 is preferably a rubber sealing ring. In order to hold gasket 36 in place and couple section 14 of the adapter to the coupling 20, a metallic, mechanical joint gland 38 is provided. Gland 38 includes a ring portion 40 having a C-shaped cross section. The interior portion of ring 40 includes pressure lip 42. The inner surface of lip 42 is preferably flat and bears against gasket 34 to apply pressure to the gasket. Formed about the periphery of ring 40 are a plurality of ears or lobes 44 which are drilled to receive mounting bolts 24 and to coincide with the holes in coupling 20. The inner surfaces of lobes 44 are inwardly offset from pressure ring 42 so that, during assembly of the joint, ring 42 will apply pressure to gasket 34 without lobes 44 completely contacting flange 22.

Figure 3:
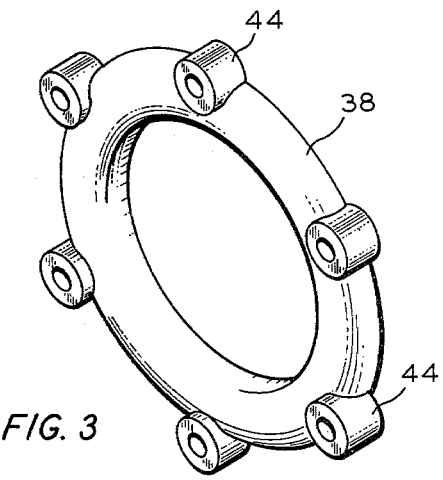
FIGS. 3 and 4 are perspective views of the clamping ring and gasket utilized in the clamping system of FIG. 2.
Figure 4:
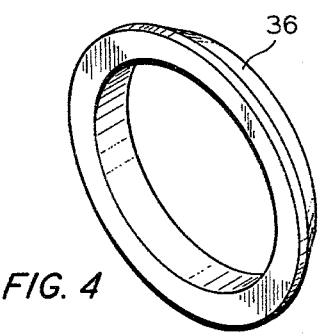
Figure 5:
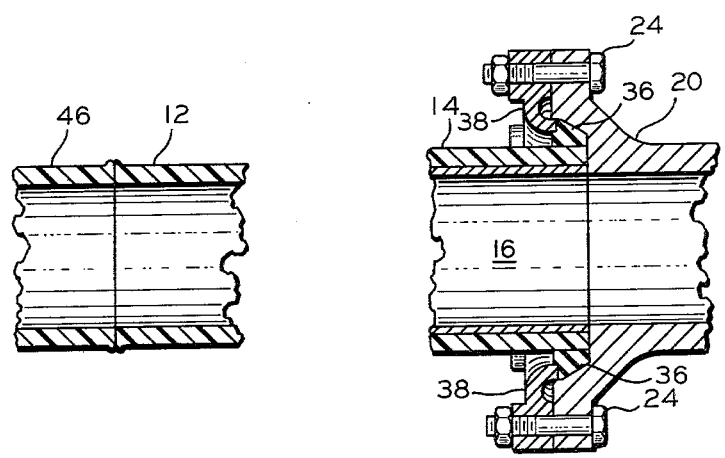
FIG. 5 is a cross-sectional view showing the adapter of the present invention coupled to a metallic pipe by the coupling system of FIG. 2 and butt fused to a plastic pipe.

FIG. 5 of the drawings shows end 12 of the adapter butted to a section of plastic pipe 46 by melt fusion and end 14 of the adapter coupled to a metallic pipe system by means of the coupling system illustrated in FIGS. 2 through 4.

Figure 6:
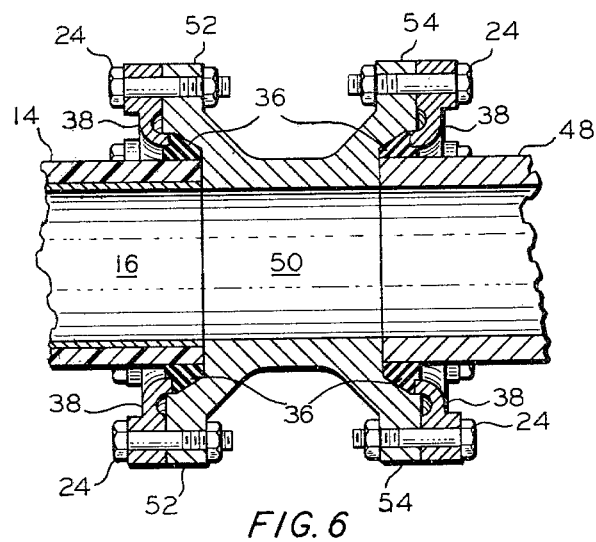
FIG. 6, FIG. 7 and FIG. 8 show cross-sectional views of alternative systems for clamping the adapter of the present invention to a metallic pipe system.

FIG. 6 of the drawings shows an alternative means of coupling a plain pipe end 48 of a metallic pipe to end 14 of the adapter of the present invention. In accordance with FIG. 6, a modified coupling 50 of metal is provided. Coupling 50 is designed and constructed in substantially the same manner as coupling 20 of FIG. 2 except that it is provided with dual flanges 52 and 54 corresponding to flange 22 of coupling 20. Otherwise, the coupled joint is exactly the same as that previously described except that a pair of gaskets 36 are utilized and a pair of joint glands 38.

Figure 7:
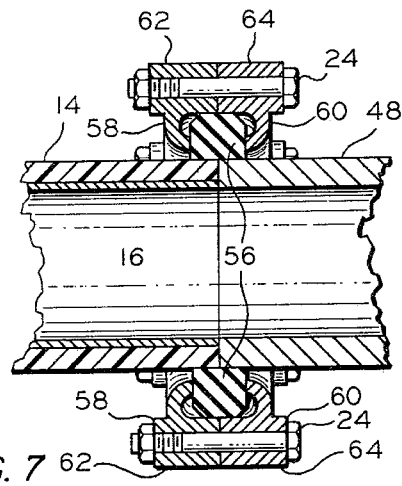

FIG. 7 shows another coupling means which can be utilized to butt join a plain end metal pipe section 48 to end 14 of the adapter. In accordance with FIG. 7 a modified gasket 56 is provided which is adapted to slip over the ends of both adapter end 14 and pipe end 48. A pair of ring glands 58 and 60 are provided. Ring glands 58 and 60 are substantially the same in structure as the previously described glands except that the lobes or ears 62 and 64 are extended inwardly so as to support the peripheral portion of gasket 56 and prevent the gasket 56 from flexing outwardly while at the same time applying an inward pressure to gasket 56. Generally gasket 56 and glands 58 and 60 are designed so that when bolts 24 are tightened the gasket 56 will be pressed into sealing engagement with end 14 of the adapter and end 48 of the metallic pipe.

Figure 8:
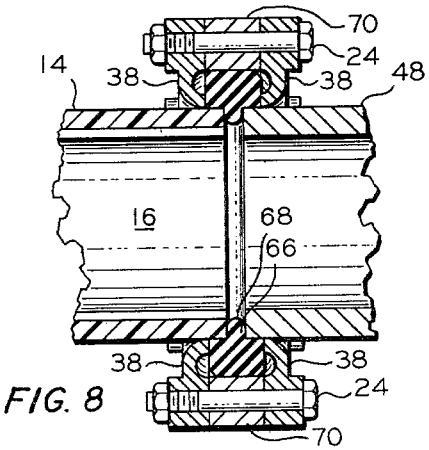

FIG. 8 shows still another coupling means for coupling end 14 of the adapter to a plain end metallic pipe 48. In accordance with FIG. 8, joint glands 38 are of exactly the same construction as those previously described with respect to FIGS. 2 through 5. Compressible gasket 66 has essentially the same peripheral configuration as gasket 56 of FIG. 7 except that it is also provided with inwardly extending flange 68. Flange 68 is adapted to be pressed between the end 14 of the adapter and the end of plain end metallic pipe 48. In order to utilize the same joint glands 38 as are utilized in the coupling shown in FIGS. 2 through 5 there is also provided a spacer ring 70. Spacer ring 70 is preferably metallic, is drilled to receive mounting bolts 24 and is utilized to fill the space between glands 38 and prevent the outward flexure of gasket 66 when pressure is applied by the mounting bolts 24 and glands 38.

While the present invention has been described in the detailed description with reference to specific structures and materials of construction, it is to be understood that various modifications and substitutions will be apparent to one skilled in the art and therefore the specific recitals contained herein are not to be considered limiting.

That which is claimed is:

1. Adapter means for connecting a plastic pipe system to a metallic pipe system, comprising:
   (a) an elongated, plastic sleeve having a substantially equal wall thickness throughout its length and having a first end adapted to be joined to said plastic pipe system and a second end adapted to be joined to said metallic pipe system; and
   (b) an elongated, metallic reinforcing sleeve, having an outside diameter substantially equal to the inside diameter of said second end of said plastic sleeve and a length less than the length of said plastic sleeve and mounted in said second end of said plastic sleeve with a first end thereof terminating inside said plastic sleeve intermediate the ends of said plastic sleeve and a second end thereof terminating flush with said second end of said plastic sleeve, said first end of said metallic reinforcing sleeve having a significant length thereof tapered from the diametric exterior and an intermediate point along the length thereof inwardly toward the central axis and to said first end thereof.

2. An adapter in accordance with claim 1 wherein the first end of the plastic sleeve is adapted to be joined to a plastic pipe of the plastic pipe system by melt fusion.

3. An adapter in accordance with claim 2 wherein the first end of the plastic sleeve has substantially the same outside diameter as the outside diameter of a plastic pipe of the plastic pipe system to which it is to be joined.

4. An adapter in accordance with claim 1 wherein the second end of the plastic sleeve has substantially the same outside diameter as the outside diameter of a metallic pipe of the metallic pipe system to which it is to be joined.

5. An adapter in accordance with claim 1, 2, 3 or 4 wherein the metallic reinforcing sleeve is mounted in the plastic sleeve by press fitting.

6. An adapter in accordance with claim 1, 2, 3 or 4 wherein the inside and outside diameters of the second end of the plastic sleeve are larger than the respective inside and outside diameters of the first end of said plastic sleeve.

7. An adapter in accordance with claim 1, 2, 3 or 4 wherein the first end of the metallic reinforcing sleeve is rounded.

8. A coupling for connecting a plastic pipe system to a metallic pipe system, comprising:
   (a) an elongated, plastic sleeve having a substantially equal wall thickness throughout its length and having a first end adapted to be joined to said plastic pipe system and a second end adapted to be joined to said metallic pipe system;
   (b) an elongated, metallic reinforcing sleeve, having an outside diameter substantially equal to the inside diameter of said second end of said plastic sleeve and a length less than the length of said plastic sleeve and mounted in said second end of said plastic sleeve with a first end thereof terminating inside said plastic sleeve intermediate the ends of said plastic sleeve and a second end thereof terminating flush with said second end of said plastic sleeve, said first end of said metallic sleeve having a significant length thereof tapered from the diametric exterior and an intermediate point along the length thereof inwardly toward the central axis thereof and to said first end thereof;
   (c) gasket means adapted to fit around a significant portion of the outside of said second end of said plastic sleeve; and
   (d) gland means adapted to slide over the outside of said second end of said plastic sleeve and longitudinally compress said gasket means against the end of said metallic pipe system and radially compress said gasket means against the outside of said second end of said plastic sleeve.

9. A coupling in accordance with claim 8 wherein the gland means has a generally C-shaped cross section, the terminal ends of said C form an inner ring and an outer ring respectively and said inner ring extends laterally beyond said outer ring and is adapted to thus longitudinally and radially compress the gasket means.

10. A coupling for connecting a plastic pipe system in abutting relation to a metallic pipe of a metallic pipe system, comprising:
    (a) an elongated, plastic sleeve having a substantially equal wall thickness throughout its length and having a first end adapted to be joined to said plastic pipe system and a second end adapted to be joined to said metallic pipe of said metallic pipe system;
    (b) an elongated, metallic reinforcing sleeve, having an outside diameter substantially equal to the inside diameter of said second end of said plastic sleeve and a length less than the length of said plastic sleeve and mounted in said second end of said plastic sleeve with a first end thereof terminating inside said plastic sleeve intermediate the ends of said plastic sleeve and a second end thereof terminating flush with said second end of said plastic sleeve, said first end of said metallic sleeve having a significant length thereof tapering from the diametric exterior and an intermediate point along the length thereof inwardly toward the central axis thereof and to said first end thereof;
    (c) gasket means adapted to fit around a significant portion of the outside of said second end of said plastic sleeve and the end of said metallic pipe of said metallic pipe system;
    (d) a first gland means adapted to slide over the outside of said end of said plastic sleeve and radially compress said gasket means against the outside of said second end of said plastic sleeve; and
    (e) second gland means adapted to slide over the outside of said metallic pipe of said metallic pipe system and radially compress said gasket means against the outside of said end of said metallic pipe of said metallic pipe system.

11. A coupling in accordance with claim 10 wherein the gasket means includes an internally projecting flange portion intermediate its sides and projecting between the ends of the second end of the plastic sleeve and the end of the metallc pipe of said metallic pipe system.

12. A coupling in accordance with claim 10 which additionally includes an annular metal ring adapted to fit over the outside of the gasket means and between the first gland means and the second gland means and prevent said gasket means from expanding outwardly when said gasket means is thus compressed by said first gland means and said second gland means.

13. A pipe line structure comprising:

(a) a plastic pipe system;

(b) a metallic pipe system terminating in an external flange means having a groove formed in the interior portion of the face thereof;

(c) an adapter means comprising an elongated, plastic sleeve having a substantially equal wall thickness throughout its length and having a first end joined to said plastic pipe system and a second end adapted to butt against and partially fill said groove formed in said external flange means and an elongated, metallic reinforcing sleeve, having an outside diameter substantially equal to the inside diameter of said second end of said plastic sleeve and a length less than the length of said plastic sleeve and mounted in said second end of said plastic sleeve with a first end thereof terminating inside said plastic sleeve intermediate the ends of said plastic sleeve and a second end thereof terminating flush with said second end of said plastic sleeve, said first end of said metallic sleeve having a significant length thereof tapered from the diametric exterior at an intermediate point along the length thereof inwardly toward the central axis thereof and to said first end thereof;

(d) compressible sealing gasket means filling the remainder of said groove formed in said flange means;

(e) gland means extending around said second end of said plastic sleeve, contacting said gasket means and compressing said gasket means laterally against said groove formed in said flange means and radially against the outside of said second end of said plastic sleeve; and (f) compression means coupled to said flange means and said gland means and urging said gland means toward said flange means.

14. A pipe line structure in accordance with claim 13 wherein the gland means has a generally C-shaped cross section, the terminal ends of said C form an inner ring and an outer ring respectively and said inner ring extends laterally beyond said outer ring and thus compresses the gasket longitudinally against the groove formed in the flange means and radially against the outside of the second end of the plastic sleeve.

15. A pipe line structure in accordance with claim 13 wherein the gasket means and the groove formed in the flange means have complementary contact surfaces tapered inwardly toward the central axis of the metallic pipe system.

16. A coupling for connecting a plastic pipe to a metallic pipe comprising:

(a) an adaptor means comprising (1) an elongated, plastic sleeve having a substantially equal wall thickness throughout its length and having a first end adapted to be joined to said plastic pipe and a second end adapted to be joined to said metallic pipe and (2) an elongated, metallic reinforcing sleeve, having an outside diameter substantially equal to the inside diameter of said second end of said plastic sleeve and a length less than the length of said plastic sleeve and mounted in said second end of said plastic sleeve with a first end thereof terminating inside said plastic sleeve intermediate the ends of said plastic sleeve and a second end thereof terminating flush with said second end of said plastic sleeve, said first end of said metallic sleeve having a significant length thereof tapering from the diametric exterior and an intermediate point along the length thereof inwardly toward the central axis thereof and to said first end thereof;

(b) a flanged metallic sleeve terminating at each end in an external flange means having a groove formed in the interior portion of a face thereof and adapted to receive said second end of said plastic sleeve in abutting relation and partially filling one of said grooves of one of said flanges and to receive the end of said metallic pipe in the other of said grooves in abutting relation and partially filling said other of said grooves.

(c) first compressible gasket means adapted to fit on the outside of said second end of said plastic sleeve and fill the remainder of said one of said grooves of said flange.

(d) second gasket means adapted to fit on the outside of said end of said metallic pipe and fill the remainder of said other of said grooves of said flange means (e) gland means adapted to extend around said second end of said plastic sleeve and contact said first gasket means and compress said first gasket means laterally against said first groove and said first flange and radially against said second end of said plastic sleeve;

(f) second gland means adapted to extend around said metallic pipe and contact said second gasket and compress said second gasket laterally against said second groove of said second flange and radially against said metallic pipe;

(g) first pressure exerting means adapted to draw said first gland means toward said first flange means; and (h) second pressure exerting means adapted to draw said second gland means toward said second flange means.

17. A coupling in accordance with claim 16 wherein the first and second gland means have a generally C-shaped cross-section forming an inner ring and an outer ring and said inner ring extends beyond said outer ring and is adapted to contact the respective ones of said first and second gasket means.

18. A coupling in accordance with claim 16 wherein the first groove means of the first flange means and the first gasket means have complementary surfaces sloping inwardly toward the central axis of the flanged metallic sleeve and the second groove means formed in the second flange means and the second gasket means have complementary surfaces sloping inwardly toward said center axis of said flanged metallic sleeve.

* * * * *